(12) United States Patent
Hsu et al.

(10) Patent No.: US 11,854,173 B2
(45) Date of Patent: Dec. 26, 2023

(54) SYSTEM AND METHOD FOR FINDING LINES IN AN IMAGE WITH A VISION SYSTEM

(71) Applicant: Cognex Corporation, Natick, MA (US)

(72) Inventors: Yu Feng Hsu, Chupei (TW); Lowell D. Jacobson, Grafton, MA (US); David Y. Li, West Roxbury, MA (US)

(73) Assignee: Cognex Corporation, Natick, MA (US)

( * ) Notice: Subject to any disclaimer, the term of this patent is extended or adjusted under 35 U.S.C. 154(b) by 169 days.

(21) Appl. No.: 17/127,868

(22) Filed: Dec. 18, 2020

(65) Prior Publication Data
US 2021/0183032 A1 Jun. 17, 2021

Related U.S. Application Data

(63) Continuation of application No. 16/215,485, filed on Dec. 10, 2018, now Pat. No. 10,902,568, which is a
(Continued)

(51) Int. Cl.
*G06T 5/20* (2006.01)
*G06T 7/13* (2017.01)
*G06T 7/143* (2017.01)

(52) U.S. Cl.
CPC .............. *G06T 5/20* (2013.01); *G06T 7/13* (2017.01); *G06T 7/143* (2017.01); *G06T 2207/20076* (2013.01)

(58) Field of Classification Search
CPC ....... G06T 11/001; G06T 11/00; G06T 7/149; G06T 7/13; G06T 7/521; G06T 7/97;
(Continued)

(56) References Cited

U.S. PATENT DOCUMENTS 4,910,786 A 3/1990 Eichel
5,559,695 A 9/1996 Daily
(Continued)

FOREIGN PATENT DOCUMENTS

CN 107085585 8/2017
EP 3079099 A1 10/2016
(Continued)

OTHER PUBLICATIONS

He, et al., Accurate and Robust Lane Detection based on Dual/View Convolutional Neutral Network, 2016 IEEE Intelligent Vehicles Symposium (IV), 2016, pp. 1041-1046, URL https://ieeexplore.ieee.org/document/7535517.
(Continued)

*Primary Examiner* — Yosef Kassa
(74) *Attorney, Agent, or Firm* — Loginov & Associates, PLLC; William A. Loginov

(57) ABSTRACT

This invention provides a system and method for finding multiple line features in an image. Two related steps are used to identify line features. First, the process computes x and y-components of the gradient field at each image location, projects the gradient field over a plurality subregions, and detects a plurality of gradient extrema, yielding a plurality of edge points with position and gradient. Next, the process iteratively chooses two edge points, fits a model line to them, and if edge point gradients are consistent with the model, computes the full set of inlier points whose position and gradient are consistent with that model. The candidate line with greatest inlier count is retained and the set of remaining outlier points is derived. The process then repeatedly applies the line fitting operation on this and subsequent outlier sets to find a plurality of line results. The process can be exhaustive RANSAC-based.

20 Claims, 9 Drawing Sheets

Related U.S. Application Data continuation of application No. 15/338,445, filed on Oct. 31, 2016, now Pat. No. 10,152,780.

(60) Provisional application No. 62/249,918, filed on Nov. 2, 2015.

(58) Field of Classification Search
CPC ........ G06V 40/16; G06V 10/44; G06V 30/40; G06F 3/04845; G06F 16/5838; G06F 16/5854

See application file for complete search history.

(56) References Cited

U.S. PATENT DOCUMENTS

| | | | |
|---|---|---|---|
| 5,825,914 A | 10/1998 | Tsuboi | |
| 5,974,169 A | 10/1999 | Bachelder | |
| 6,005,984 A | 12/1999 | Kawakami | |
| 6,021,221 A * | 2/2000 | Takaha | G06F 3/04845 382/175 |
| 6,137,893 A | 10/2000 | Michael | |
| 6,256,109 B1 * | 7/2001 | Rosenbaum | G06K 15/02 358/1.1 |
| 6,405,072 B1 * | 6/2002 | Cosman | A61B 90/16 606/130 |
| 6,418,424 B1 | 7/2002 | Hoffberg | |
| 6,460,127 B1 | 10/2002 | Akerib | |
| 6,621,924 B1 | 9/2003 | Ogino | |
| 6,640,002 B1 | 10/2003 | Kawada | |
| 6,728,404 B1 | 4/2004 | Ono | |
| 6,778,688 B2 | 8/2004 | Aggarwal | |
| 6,778,699 B1 | 8/2004 | Gallagher | |
| 6,829,384 B2 | 12/2004 | Schneiderman | |
| 6,868,175 B1 | 3/2005 | Yamamoto | |
| 6,954,550 B2 | 10/2005 | Fujieda | |
| 7,006,694 B1 | 2/2006 | Melikian | |
| 7,026,615 B2 * | 4/2006 | Takane | H01J 37/28 382/149 |
| 7,039,216 B2 * | 5/2006 | Shum | G06T 11/001 382/293 |
| 7,062,093 B2 | 6/2006 | Steger | |
| 7,095,432 B2 | 8/2006 | Nakayama | |
| 7,106,886 B2 | 9/2006 | Shimakage | |
| 7,110,602 B2 | 9/2006 | Krause | |
| 7,116,823 B2 | 10/2006 | Clark | |
| 7,190,832 B2 | 3/2007 | Frost | |
| 7,212,672 B2 | 5/2007 | Fujieda | |
| 7,235,782 B2 * | 6/2007 | Takane | H01J 37/28 250/310 |
| 7,236,632 B2 * | 6/2007 | Erol | G06V 30/40 382/218 |
| 7,239,740 B1 | 7/2007 | Fujieda | |
| 7,324,661 B2 | 1/2008 | Kemp | |
| 7,394,938 B2 * | 7/2008 | Erol | G06F 16/5838 382/218 |
| 7,400,414 B2 * | 7/2008 | Tobiason | G06T 7/521 356/396 |
| 7,400,770 B2 | 7/2008 | Keaton | |
| 7,412,089 B2 | 8/2008 | Squires | |
| 7,415,156 B2 | 8/2008 | McCormack | |
| 7,500,511 B2 | 3/2009 | Connors | |
| 7,550,707 B2 | 6/2009 | Hashimoto | |
| 7,636,455 B2 | 12/2009 | Keaton | |
| 7,660,455 B2 | 2/2010 | Yamamoto | |
| 7,689,016 B2 | 3/2010 | Stoecker | |
| 7,692,664 B2 | 4/2010 | Weiss | |
| 7,796,801 B2 | 9/2010 | Kitamura | |
| 7,817,844 B2 | 10/2010 | Kitamura | |
| 7,831,098 B2 | 11/2010 | Melikian | |
| 7,927,278 B2 * | 4/2011 | Selzer | A61B 5/02007 600/443 |
| 8,045,785 B2 | 10/2011 | Kitamura | |
| 8,063,889 B2 | 11/2011 | Anderson | |
| 8,090,186 B2 | 1/2012 | Nagano | |
| 8,121,350 B2 | 2/2012 | Klefenz | |
| 8,121,618 B2 | 2/2012 | Rhoads | |
| 8,194,953 B2 | 6/2012 | Xie | |
| 8,213,679 B2 | 7/2012 | Yao | |
| 8,237,935 B2 | 8/2012 | Nygaard | |
| 8,331,653 B2 | 12/2012 | Seki | |
| 8,335,353 B2 | 12/2012 | Yamamoto | |
| 8,385,644 B2 | 2/2013 | Stojancic | |
| 8,422,761 B2 | 4/2013 | Kitamura | |
| 8,477,999 B2 | 7/2013 | Nishida | |
| 8,503,757 B2 | 8/2013 | Naruse | |
| 8,514,282 B2 | 8/2013 | Imanishi | |
| 8,565,536 B2 | 10/2013 | Liu | |
| 8,740,958 B2 | 6/2014 | Anderson | |
| 8,787,678 B2 | 7/2014 | Melikian | |
| 8,805,083 B1 | 8/2014 | Sieracki | |
| 8,861,853 B2 | 10/2014 | Kawai | |
| 8,953,855 B2 * | 2/2015 | Namai | G06T 7/13 382/199 |
| 8,977,005 B2 | 3/2015 | Hirakawa | |
| 9,025,866 B2 | 5/2015 | Liu | |
| 9,088,715 B2 | 7/2015 | Ohmiya | |
| 9,400,769 B2 * | 7/2016 | Balinsky | G06F 40/117 |
| 9,928,654 B2 | 3/2018 | Miller | |
| 10,152,780 B2 | 12/2018 | Hsu | |
| 10,248,124 B2 | 4/2019 | Bellaiche | |
| 10,878,574 B2 | 12/2020 | Mao | |
| 2005/0286767 A1 | 12/2005 | Hager | |
| 2006/0285755 A1 | 12/2006 | Hager | |
| 2008/0063238 A1 | 3/2008 | Wiedemann | |
| 2008/0292194 A1 | 11/2008 | Schmidt | |
| 2009/0009513 A1 | 1/2009 | van de Hengel | |
| 2010/0080469 A1 | 4/2010 | Liu | |
| 2010/0189354 A1 | 7/2010 | De Campos | |
| 2011/0299770 A1 | 12/2011 | Vaddadi | |
| 2013/0021629 A1 | 1/2013 | Kurilin | |
| 2015/0055821 A1 | 2/2015 | Fotland | |
| 2015/0324689 A1 | 11/2015 | Wierzynski | |
| 2017/0028562 A1 | 2/2017 | Yamazaki | |
| 2017/0236055 A1 | 8/2017 | Lin | |
| 2018/0181817 A1 | 6/2018 | Yan | |

FOREIGN PATENT DOCUMENTS

| | | |
|---|---|---|
| JP | 61120002 A | 6/1986 |
| JP | 07229717 A | 8/1995 |
| JP | H08237537 | 9/1996 |
| JP | 2002288634 A | 10/2002 |
| JP | 2003187220 A | 7/2003 |
| JP | 2005322044 | 11/2005 |
| JP | 2006260527 | 9/2006 |
| JP | 2007018269 | 1/2007 |
| JP | 2007047933 A | 2/2007 |
| JP | H09026307 A | 2/2009 |
| JP | 2010092199 | 4/2010 |
| JP | 2012027617 | 2/2012 |
| JP | 2012511760 | 5/2012 |
| JP | 2012514252 A | 6/2012 |
| JP | 2013084221 A | 5/2013 |
| JP | 2013092955 | 5/2013 |
| JP | 2014092922 A | 5/2014 |
| JP | 2014149788 A | 8/2014 |
| JP | 2015501060 | 1/2015 |
| JP | 2015501060 A | 1/2015 |
| JP | 2015103075 A | 6/2015 |
| JP | 2016194925 A | 11/2016 |
| JP | 201790450 A | 5/2017 |
| JP | 2017516992 A | 6/2017 |
| JP | 2017533482 A | 11/2017 |
| KR | 1020130010833 | 1/2013 |
| KR | 20140124427 | 10/2014 |
| KR | 20170051369 | 5/2017 |
| WO | 1997021188 A1 | 6/1997 |

(56) References Cited

FOREIGN PATENT DOCUMENTS

| | | |
|---|---|---|
| WO | 2001078005 A2 | 10/2001 |
| WO | 2015177268 A1 | 11/2015 |

OTHER PUBLICATIONS

Mohd Ashri Abu Hassan et al., and Evaluation of Sobel, Canny, and Shen & Castan using sampleline histogram method and 2008 International Symposium on Information Technology, US, IEEE, Aug. 28, 2008, https://ieeexplore.ieee.org/document/4632072.

Onoguchi The 1 rule Kazunori Onoguchi, automatic operation, and running environment recognition technology for it, The Journal of The Institute of Image Information and Television Engineers, The 68th Volume, No. 10, The Journal of The Institute of Image Information and Television Engineers, JP, general incorporated foundation Institute of Image Information and Television Engineers, Oct. 1, 2014, vol. [68th] No. 10, 775-779.

Payet et al., "SLEDGE: Sequential Labeling of Image Edges for Boundary Detection", Int J Comput Vis (2013) 104:15-37.

Akinlar, Cuney; Topal, Cihan: EDLines: A real-time line segment detector with a false detection control. Pattern Recognition Letters, 2011, 32nd ed, No. 13, pp. 1633-1642. DOI: 10.1016/j.patrec.2011.06.001. Retrieved Ober: URL: https://www.researchgate.net/profile/Cihan Topal/publication/220644982_EDLines_A_real-time_line_segment_detector_with_a_false_detection_control/links/61069f68169a1aO103cd2a9a/EDLines-A-real-lime-line-segmenl-deleclor-wilh-a-false-delection-conlrol.pdf. [retrieved Oct. 6, 2022.

Prasanna, Prateek [et al.]: Automated crack detection on concrete bridges. In: IEEE Transactions on automation science and engineering, 2014, vol. 13, No. 2, pp. 591-599. IEEE Xplore [online], DOI: 10.1109/TASE.2014.2354314, In: Google Scholar.

Yu, Zhiding [et al.]: Casenet: Deep category-aware semantic edge detection. Proceedings of the IEEE conference on computer vision and pattern recognition. 2017. pp. 5964-5973. thecvf [online]. Retrieved Ober: URL: https://openaccess.thecvf.com/content_cvpr_2017/ html/Yu_CASENet_Deep_Category-Aware_CVPR_2017_paper.html.In: Google Scholar.

Akinlar, Cuney; Topal, Cihan: EDLines: A real-time line segment detector with a false detection control. Pattern Recognition Letters, 2011, 32nd ed, No. 13, pp. 1633-1642. DOI: 10.1016/j.patrec.2011.06.001. Retrieved Ober: URL: https://www.researchgate.net/profile/Cihan Topal/publication/220644982_EDLines_A_real-time_line_segment_detector_with_a_false_detection_control/links/61069f68169a1aO103cd2a9a/EDLines-A-real-time-line-segmenl-deleclor-wilh-a-false-delection-conlrol.pdf. [retrieved Oct. 6, 2022.

Canny, John: A computational approach to edge detection. IEEE Transactions on pattern analysis and machine intelligence, 1986, No. 6, pp. 679-698. IEEE Xplore [online]. DOI: 10.1109/TPAMI.1986.4767851, In: Google Scholar.

Cutler, D. Richard [et al.]: Random forests for classification in ecology. Ecology, 2007, 88th ed, No. 11, pp. 2783-2792. Wiley Online Library [online]. DOI: 10.1890/07-0539.1, In: Google Scholar.

Jadhav, Sayali D.; Channe, H.P.: Comparative study of K-NN, naive Bayes and decision tree classification techniques. In: International Journal of Science and Research (IJSR), 2016, vol. 5, No. 1, pp. 1842-1845. academia. edu [online]. accessed Ober URL: https://scholar.google.de/, In: Google Scholar.

Prasanna, Prateek [et al.] : Automated crack detection on concrete bridges . In: IEEE Transactions on automation science and engineering, 2014, vol. 13, No. 2, pp. 591-599. IEEE Xplore [online]. DOI: 10.1109ITASE.2014.2354314, In: Google Scholar.

Scikit-Learn: 3.2.4.3.1. sklearn.ensemble.RandomForestClassifier, May 22, 2018. URL: https://web.archive.org/web/20180522195936/https://scikit-learn.org/stable/modules/generated/sklearn.ensemble.RandomForestClassifier.html [accessed May 19, 2022.

Statistical classification. In: Wikipedia, The Free Encyclopedia. Edit date: May 28, 2018 16:12 UTC. URL: https://en.wikipedia.org/w/index.php?title=Statistical_classification&oldid=843354472 [accessed May 18, 2022].

Yu, Zhiding [et al.]: Casenet: Deep category-aware semantic edge detection. Proceedings of the IEEE conference on computer vision and pattern recognition. 2017. pp. 5964-5973. thecvf [online]. Retrieved Ober: URL: https://openaccess.thecvf.com/content_cvpr_2017/ html/Yu_CASENet_Deep_Category-Aware_CVPR_2017_paper.html.ln: Google Scholar.

* cited by examiner

LightToDark POLARITY

DarkToLight POLARITY

EITHER POLARITY

MIXED-POLARITY

SYSTEM AND METHOD FOR FINDING LINES IN AN IMAGE WITH A VISION SYSTEM

RELATED APPLICATION

This application is a continuation of co-pending U.S. patent application Ser. No. 16/215,485, entitled SYSTEM AND METHOD FOR FINDING LINES IN AN IMAGE WITH A VISION SYSTEM, filed Dec. 10, 2018, which is a continuation of co-pending U.S. patent application Ser. No. 15/338,445, entitled SYSTEM AND METHOD FOR FINDING LINES IN AN IMAGE WITH A VISION SYSTEM, filed Oct. 31, 2016, now U.S. Pat. No. 10,152,780, issued Dec. 11, 2018, which claims the benefit of U.S. Provisional Application Ser. No. 62/249,918, entitled SYSTEM AND METHOD FOR FINDING LINES IN AN IMAGE WITH A VISION SYSTEM, filed Nov. 2, 2015, the teachings of each of which applications are incorporated herein by reference.

FIELD OF THE INVENTION

This invention relates to machine vision systems, and more particularly to vision system tools that find line features in acquired images

BACKGROUND OF THE INVENTION

Machine vision systems (also termed herein, simply "vision systems") are used for a variety of tasks in manufacturing, logistics, and industry. Such tasks can include surface and part inspection, alignment of objects during assembly, reading of patterns and ID codes, and any other operation in which visual data is acquired and interpreted for use in further processes. Vision systems typically employ one or more cameras that acquire images of a scene containing an object or subject of interest. The object/subject can be stationary or in relative motion. Motion can also be controlled by information derived by the vision system, as in the case of manipulation of parts by a robot.

A common task for a vision system is finding and characterizing line features in an image. A variety of tools are used to identify and analyze such line features. Typically, these tools rely upon a sharp contrast difference that occurs in a portion of the image. This contrast difference is analyzed using e.g. a caliper tool to determine if the individual points in the image with contrast difference can be assembled into a line-like feature. If so, then a line is identified in the image. Notably, the tools that find edge points and those that attempt to fit a line to the points act independently of each other. This increases processing overhead and decreases reliability. Where an image contains multiple lines, such tools may be limited in ability to accurately identify them. Furthermore, traditional, line-finding tools that are designed to find a single line in an image can be problematic to use when the image contains multiple closely spaced lines with similar orientation and polarity.

SUMMARY OF THE INVENTION

This invention overcomes disadvantages of the prior art by providing a system and method for finding line features in an image that allows multiple lines to be efficiently and accurately identified and characterized. First, the process computes x and y-components of the gradient field at each location of the image, projects the gradient field over a plurality of image subregions, and detects within each subregion a plurality of gradient extrema, yielding a plurality of edge points with associated position and gradient. Next, the process iteratively chooses two edge points, fits a model line to those edge points, and if the gradients of those edge points are consistent with the model line, computes the full set of inlier points whose position and gradient are consistent with that model line. The candidate line with greatest inlier count is retained as a line result and the set of remaining outlier points is derived. The process then repeatedly applies the line fitting operation on this and subsequent outlier sets to find a plurality of line results. The line-fitting process can be exhaustive, or based on a random sample consensus (RANSAC) technique.

In an illustrative embodiment, a system for finding line features in an acquired image is provided. A vision system processor receives image data of a scene containing line features. An edge point extractor generates intensity gradient images from the image data and finds edge points based upon the intensity gradient images. A line-finder then fits the edge points to one or more lines based upon the intensity gradient in the edge points. Illustratively, the line finder operates a RANSAC-based process to fit inlier edge points to new lines including iteratively defining lines from outlier edge points with respect to previously defined lines. The edge point extractor performs a gradient field projection of line-feature-containing regions of the intensity gradient images. Illustratively the gradient field projection is oriented along a direction set in response to an expected orientation of one or more or the line features and the gradient field projection can define a granularity based on a Gaussian kernel. Illustratively, the image data can comprise data from a plurality of images acquired from a plurality of cameras and transformed into a common coordinate space. The image data can also be smoothed using a smoothing (weighting) kernel, which can comprise a 1D Gaussian kernel or another weighting function. The edge points can be selected based upon a threshold defined by an absolute contrast and a contrast that is normalized based on average intensity of the image data. Illustratively, the line finder is constructed and arranged to exchange edge points representing portions of parallel lines or crossing lines to correct erroneous orientations, and/or to identify lines with polarity variation, including mixed polarities in line features based on gradient values in the edge points. Also, illustratively, the edge point extractor is arranged to find a plurality of gradient magnitude maxima in each of the gradient projection sub-regions. These gradient magnitude maxima can be respectively identified as some of the plurality edge points, and can be described by a position vector and a gradient vector. Additionally, the line finder can be arranged to determine consistency between at least one edge point of the extracted plurality of edge points and at least one candidate line of the found plurality of lines by computing a metric. This metric can be based upon a distance of the at least one edge point from the candidate line and an angle difference between a gradient direction of the edge point and a normal direction of the candidate line.

BRIEF DESCRIPTION OF THE DRAWINGS

The invention description below refers to the accompanying drawings, of which.

DETAILED DESCRIPTION

Figure 1:
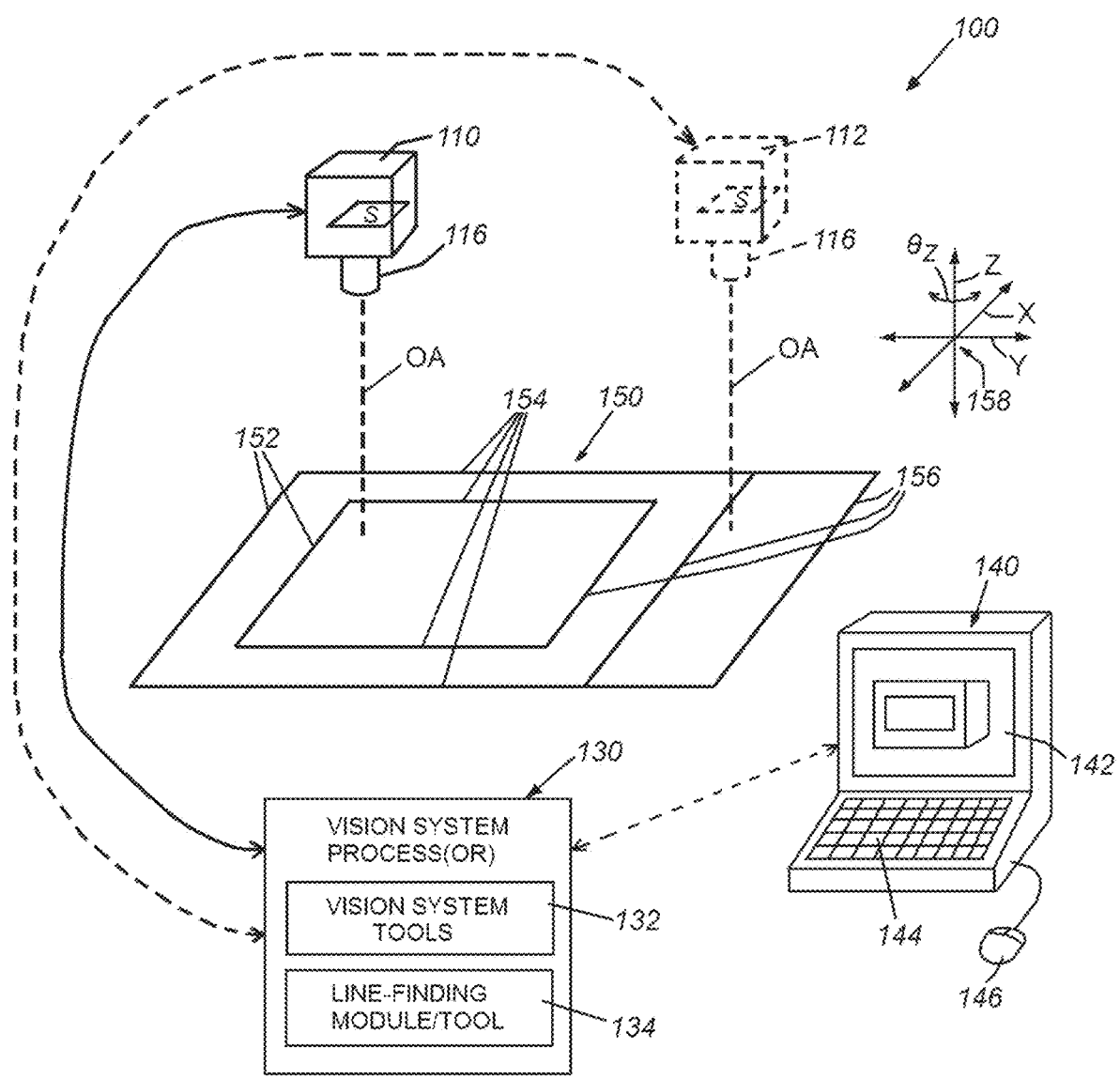
FIG. 1 is a diagram of an exemplary vision system arrangement acquiring images of an object that includes multiple edge features and a vision system processor including an edge-finding tool/module in accordance with an illustrative embodiment.

An exemplary vision system arrangement 100 that can be employed according to an illustrative embodiment is shown in FIG. 1. The system 100 includes at least one vision system camera 110, and can include one or more additional, optional cameras 112 (shown in phantom). The illustrative camera(s) 110, 112 include(s) an image sensor (or imager) S and associated electronics for acquiring and transmitting image frames to a vision system process(or) 130 that can be instantiated in a standalone processor and/or a computing device 140. The camera 110 (and 112) includes an appropriate lens/optics 116 focused upon a scene that contains an object 150 under inspection. The camera 110 (and 112) can include internal and/or external illuminators (not shown) that operate in accordance with the image acquisition process. The computing device 140 can be any acceptable processor-based system capable of storing and manipulating image data in accordance with the illustrative embodiment. For example, the computing device 140 can comprise a PC (as shown), server, laptop, tablet, smartphone or other similar device. The computing device 140 can include appropriate peripherals, such as a bus-based image capture card that interconnects to the camera. In alternate embodiments, the vision processor can be partially or fully contained within the camera body itself and can be networked with other PCs, servers and/or camera-based processors that share and process image data. The computing device 140 optionally includes an appropriate display 142, which can support an appropriate graphical user interface (GUI) that can operate in accordance with vision system tools and processors 132 provided in the vision system process(or) 130. Note that a display can be omitted in various embodiments and/or provided only for setup and service functions. The vision system tools can be part of any acceptable software and/or hardware package that is acceptable for use in the inspection of objects, such as those commercially available from Cognex Corporation of Natick, Mass. The computing device can also include associated user interface (UI) components, including, for example, a keyboard 144 and mouse 146, as well as a touchscreen within the display 142.

The camera(s) 110 (and 112) image some or all of an object 150 located within the scene. Each camera defines an optical axis OA, around which a field of view is established based upon the optics 116, focal distance, etc. The object 150 includes a plurality of edges 152, 154 and 156 that are respectively arranged in different directions. For example, the object edges can comprise those of a cover glass mounted within a smartphone body. Illustratively, the camera(s) can image the entire object, or specific locations (e.g. corners where the glass meets the body). A (common) coordinate space can be established with respect to the object, one of the cameras or another reference point (for example a moving stage upon which the object 150 is supported). As shown, the coordinate space is represented by axes 158. These axes illustratively define orthogonal x, y and z axes and rotation Oz about the z axis in the x-y plane.

According to an illustrative embodiment, the vision system process 130 interoperates with one or more applications/processes (running on the computing device 140) that collectively comprise a set of vision system tools/processes 132. These tools can include a variety of conventional and specialized applications that are used to resolve image data—for example a variety of calibration tools and affine transform tools can be used to transform acquired image data to a predetermined (e.g. common) coordinate system. Tools that convert image grayscale intensity data to a binary image based upon a predetermined threshold can also be included. Likewise, tools that analyze the gradient of intensity (contrast) between adjacent image pixels (and subpixels) can be provided.

Figure 2:
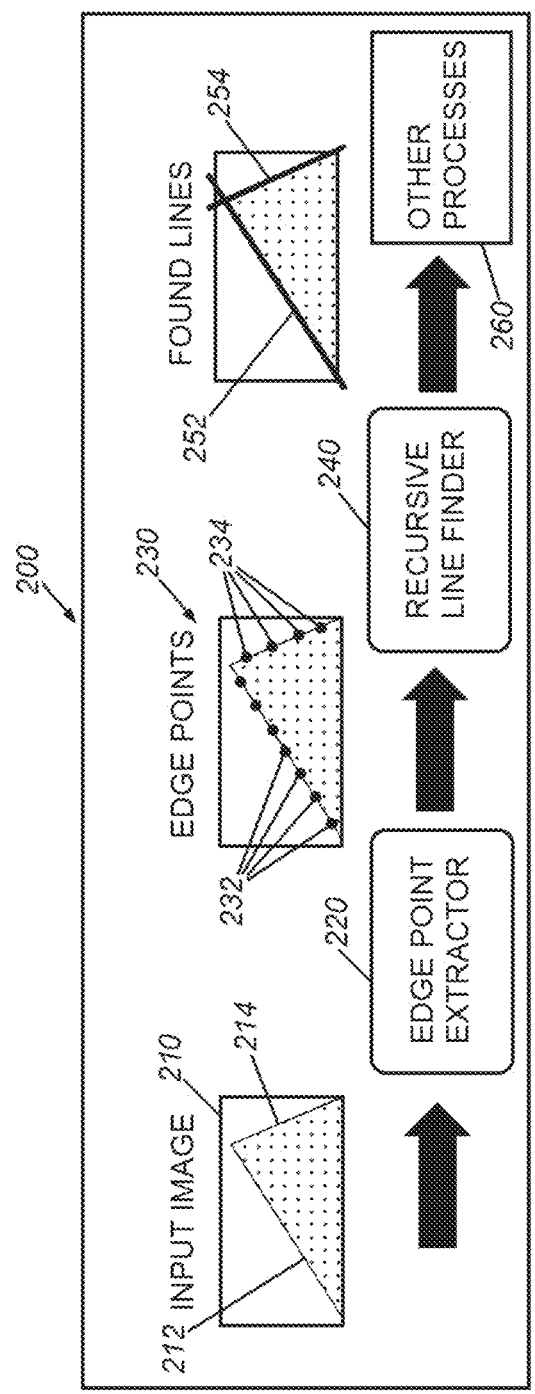
FIG. 2 is a diagram showing an overview of the system and method for edge-point extraction and line finding from an acquired image according to an illustrative embodiment.

The vision system process(or) 130 includes a line-finding process, tool or module 134 that locates multiple lines in an acquired image according to an illustrative embodiment. Reference is, thus, made to FIG. 2, which graphically depicts an overview of a line-finding procedure 200 according to the illustrative embodiment. The procedure 200 consists of two primary parts. An input image 210 is provided to the processor. As shown, the image includes a pair of intersecting edges 212 and 214. These can represent a corner region of the above-described object 150. An edge point extractor 220 processes the input image 210 to obtain a set 230 of candidate edge points, including edge points 232 and 234 that respectively reside along edges 212 and 214. The edge points 232, 234, and their associated data (e.g. intensity gradient information described below), are provided to a recursive line finder 240, which performs a series of iterative processes on selected edge points. The goal of the iterative processes is an attempt to fit other found edge points to candidate line features. The line-finding process 240 results in found lines 252 and 254 as shown. These results can be provided to other downstream processes 260 that use the information—e.g. alignment processes, robot manipulation, inspection, ID reading, part/surface inspection, etc.

Figure 3:
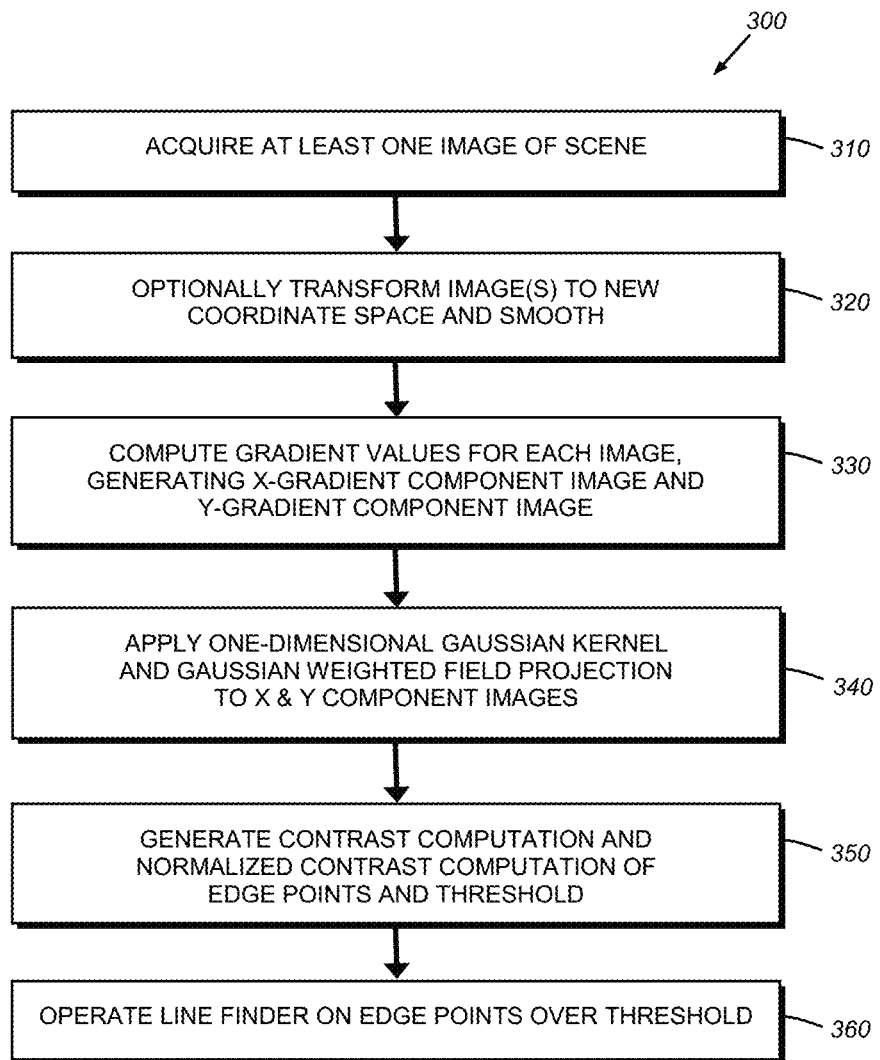
FIG. 3 is a flow diagram of an edge point extraction procedure according to the system and method of FIG. 2.

Reference is made to FIG. 3, which describes a procedure for extracting edge points according to an embodiment. One or more images are acquired of the scene, which contains an object or surface having edge features to be found (step 310). The image(s) can be extracted by a single camera or by a plurality of cameras. In either case, the image pixels can be (optionally) transformed by appropriate calibration parameters to a new and/or common coordinate space in step 320. This step can also include smoothing of the image as described below. In certain embodiments, where a plurality of cameras image discontinuous regions of the scene—for example focusing on corner regions of a larger object—the common coordinate space can account for the empty region between camera fields of view. As described below, lines that extend between such fields of view (e.g. the object edge that connects two found corner regions) can be extrapolated by the system and method of the illustrative embodiment. The edge points required for finding lines are extracted from the image(s) in the appropriate coordinate space by the edge point extractor using gradient field projection in step 330. Gradient values are first computed for each pixel, generating two images for x and y gradient components. The image(s) are further processed by projecting the gradient field over many caliper-like regions. Unlike a conventional caliper tool which projects the intensity value, by projecting the gradient field in accordance with the embodiment, gradient orientation can be preserved, which facilitates the subsequent line-finding process as described below.

Figure 4:
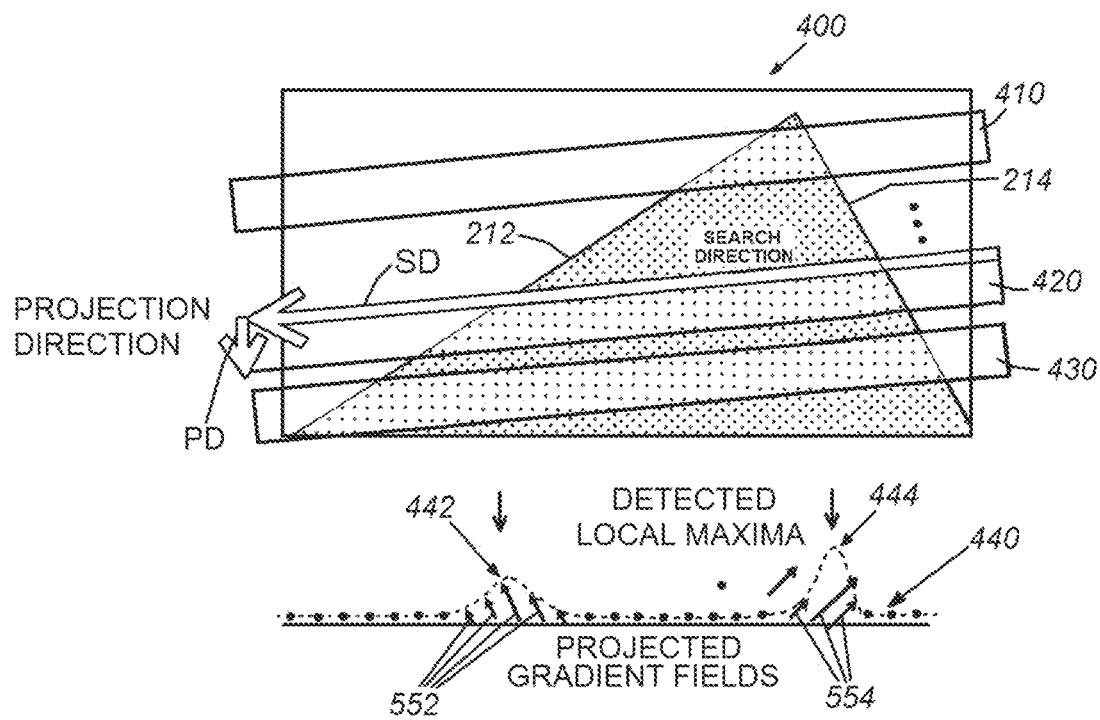
FIG. 4 is a diagram of a field projection on a region of an image containing edge features, which is part of the edge point extraction procedure of FIG. 3.

In step 340, and also referring to the diagram of FIG. 4, a portion (a caliper-like region) 400 of the image containing the candidate edge features is subjected to a gradient field projection (represented by a plurality of projections 410, 420, 430, searched across the (approximately) expected orientation of the edges in a search direction (arrow SD), with the projections repeated across the region 400 in an orthogonal projection direction (arrow PD). For each projection (e.g. projection 420) edges appear as local maxima in a gradient field 440 associated with the projection. In general, a series of edge points within the projection that are associated with an edge will exhibit an intensity gradient (vectors 552, 554) orthogonal to the direction of extension of the edge. As described below, the user can define the projection direction based on expected line orientation. Alternatively, this can be provided by default or by another mechanism—e.g. analysis of the features in the image.

Figure 5:
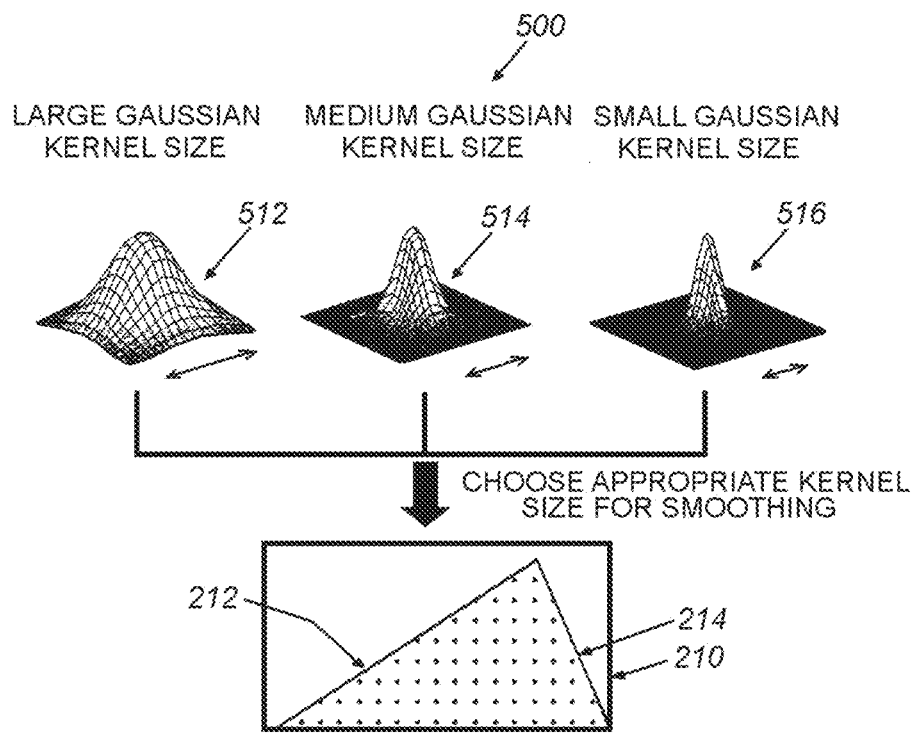
FIG. 5 is a diagram showing application of a Gaussian kernel to the image to smooth the image, for use in the edge point extraction procedure of FIG. 3.

Two granularity parameters are involved in the above-described gradient projection step. Prior to gradient field calculation, the user can choose to smooth the image using an isotropic Gaussian kernel. A first granularity determines the size of this Gaussian smoothing kernel. As shown in the diagram 500 of FIG. 5, an application of an appropriately sized Gaussian kernel (e.g. large 512, medium 514, small 516) is made to smooth the image 210. The first granularity parameter, hence, determines the size of the isotropic Gaussian smoothing kernel prior to field calculation.

Figure 6:
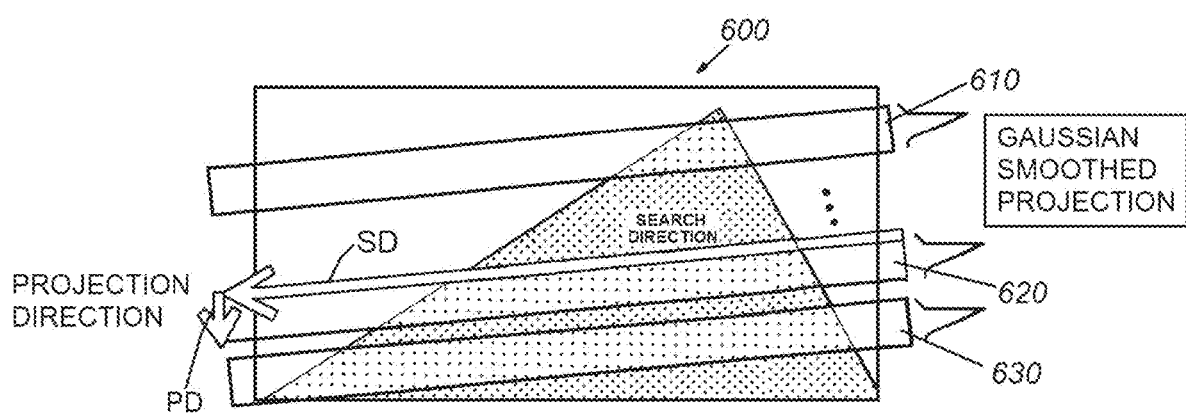
FIG. 6 is a diagram of a field projection, including application of a Gaussian kernel for smoothing of the projection, for use in the edge point extraction procedure of FIG. 3.

After gradient field calculation, a Gaussian-weighted projection is thereby performed by the process, rather than uniform weighting in conventional caliper tools. Thus, a second granularity parameter determines the size of the one-dimensional (1D) Gaussian kernel used during field projection as shown in FIG. 6, in which the region 600 is subjected to a Gaussian-smoothed kernel 610, 620, 630.

During a typical operation, the user verifies (using the GUI) all extracted edges overlaid on the image, and then adjusts the granularities and contrast thresholds until the number of extracted edges along the lines to be found appears satisfactory, while avoiding an excessive number of edges due to background noise in the image. In other words, this step allows the signal-to-noise ratio to be optimized for the image characteristic. This adjustment can also be performed automatically by the system, using a default value in various embodiments. Note that the use of a Gaussian weighting function is one of a variety of approaches for weighting the projection, including (e.g.) a uniform weighting.

Figure 7:
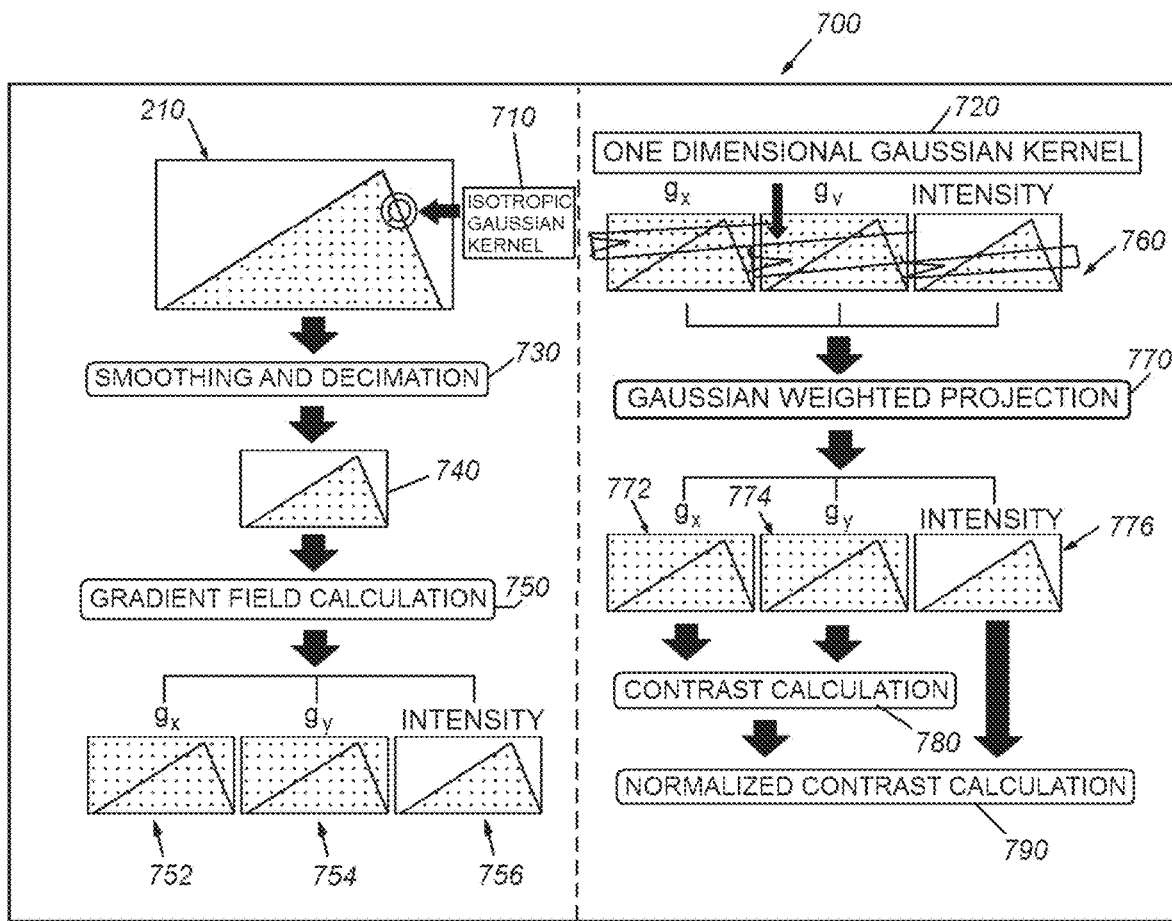
FIG. 7 is a diagram showing a graphical overview of the edge point extraction procedure of FIG. 3 including application of Gaussian kernels and calculation of absolute and normalized contrast thresholds for edge points.
Figure 8:
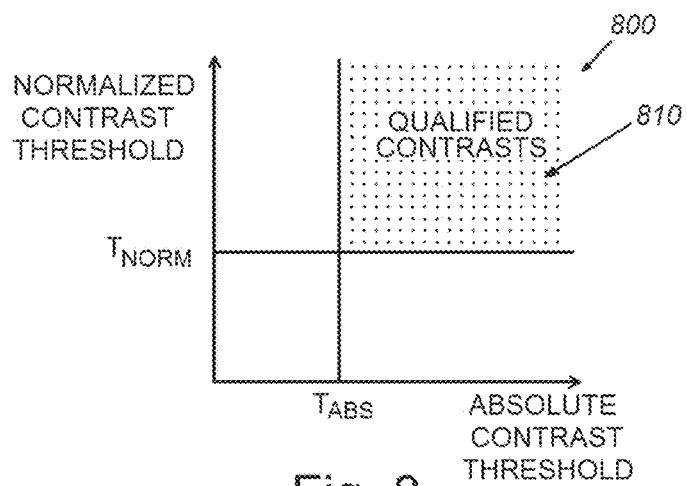
FIG. 8 is graph showing a region of qualified contrasts for edge points having a sufficient absolute contrast threshold and normalized contrast threshold.

The overall flow of gradient field extraction and projection is illustrated graphically in the diagram 700 of FIG. 7. The two granularity parameters, the isotropic Gaussian kernel 710 and the 1D Gaussian kernel 720, are each shown in each half of the overall diagram 700. As shown, each acquired image 210 is subjected to smoothing and decimation 730. The resulting image 740 is then subjected to gradient field calculation 750, as described above, to generate the two gradient images 752 and 754. These gradient images are also represented as $g_x$ and $g_y$, representing two orthogonal axes in the common coordinate space. Note that in addition to two gradient images, the intensity image 756 is also typically subjected to the smoothing, decimation and projection process 760 (using a Gaussian-weighted projection 770 based upon the 1D Gaussian kernel 720) since the processed intensity information is also employed for calculating normalized contrasts in accordance with an embodiment—described below. The result is the projection profiles of gradient images 772 ($g_x$), 774 ($g_y$), and intensity image 776.

Referring also to step 350 of the procedure 300 (FIG. 3), qualified edge points are then extracted by combining the 1D projection profiles of both x & y gradient images. This is accomplished using a raw contrast calculation 780 and a normalized contrast calculation 790 based on the Intensity image. More particularly, any local peaks with both raw projected gradient magnitudes and normalized projected gradient magnitudes exceeding respective thresholds are considered a candidate edge point for subsequent line finding according to the following illustrative equations:

$$(g_x^2+g_y^2)^{1/2}>T_{ABS}$$

$$(g_x^2+g_y^2)^{1/2}I>T_{NORM}$$

where $g_x$ and $g_y$ are the values of the x-gradient and y-gradient projections at a pixel location, respectively, I the intensity, $T_{ABS}$ an absolute contrast threshold for raw projected gradient magnitudes and $T_{NORM}$ is a normalized contrast threshold for intensity-normalized projected gradient magnitudes.

Notably, a point is only considered a candidate edge point when its absolute and normalized contrasts both exceed their respective thresholds. This is shown by the upper right quadrant 810 in the exemplary graph 800 of normalized contrast threshold $T_{NORM}$ versus absolute contrast threshold $T_{ABS}$. The use of dual (absolute and normalized) thresholds differs generally from existing approaches that typically employ an absolute contrast threshold. The benefits of dual contrast thresholds are clear, by way of example, when an image includes both dark and bright intensity regions that both include edges of interest. In order to detect edges in dark regions of the image, it is desirable to set a low contrast threshold. However, such a low contrast setting can result in the detection of false edges in the bright portions of the image. Conversely, in order to avoid the detection of false edges in the bright regions of the image, it is desirable to set a high contrast threshold. However, with a high contrast setting, the system may fail to adequately detect edges in dark regions of the image. By using a second normalized contrast threshold, in addition to the traditional absolute contrast threshold, the system can appropriately detect edges both in dark and bright regions, and avoid detecting false edges in bright regions of the image. Hence, by enabling the detection of relevant edges while avoiding spurious edges, the use of dual contrast thresholds serves to maximize the speed and robustness of the subsequent line-finding stage of the overall process.

Referring further to procedure step 350 (FIG. 3), once all edge points are extracted, they are represented and stored in a data structure that is convenient for subsequent line-finders to operate upon. Note, for example, the following tuple:

$$p=(x,y,g_x,g_y,g_m,g_o,I,g_m/I,m,n)$$

where (x,y) is the location of the edge point, $(g_x,g_y)$ are the values of its respective x-gradient and y-gradient projections, $(g_m,g_o)$ is the gradient magnitude and orientation computed from $(g_x,g_y)$, I is the intensity at the edge point location, $g_m/I$ is the intensity-normalized contrast obtained by dividing the gradient magnitude $g_m$ by the intensity I, m is the image index and n is the projection region index. The location of the edge point, as in the standard caliper tool, can be interpolated for improved accuracy.

Note that the edge-point extraction process generally operates to run field projections in a single direction that substantially matches the expected line angle. The tool is, therefore, most sensitive to edges at this angle, and its sensitivity falls off gradually for edges at other angles, where the rate of fall-off depend on the granularity settings that indirectly determine the field projection length. As a result, the process is limited to finding lines whose angle is "near" the expected line angle, subject to the angle range specified by the user. While the process is adapted to find lines that are not orthogonal, it is contemplated that it could be generalized in various embodiments to find lines of any angle over 360 degrees by performing projections in multiple directions (omnidirectional line-finding), including orthogonal directions.

Figure 9:
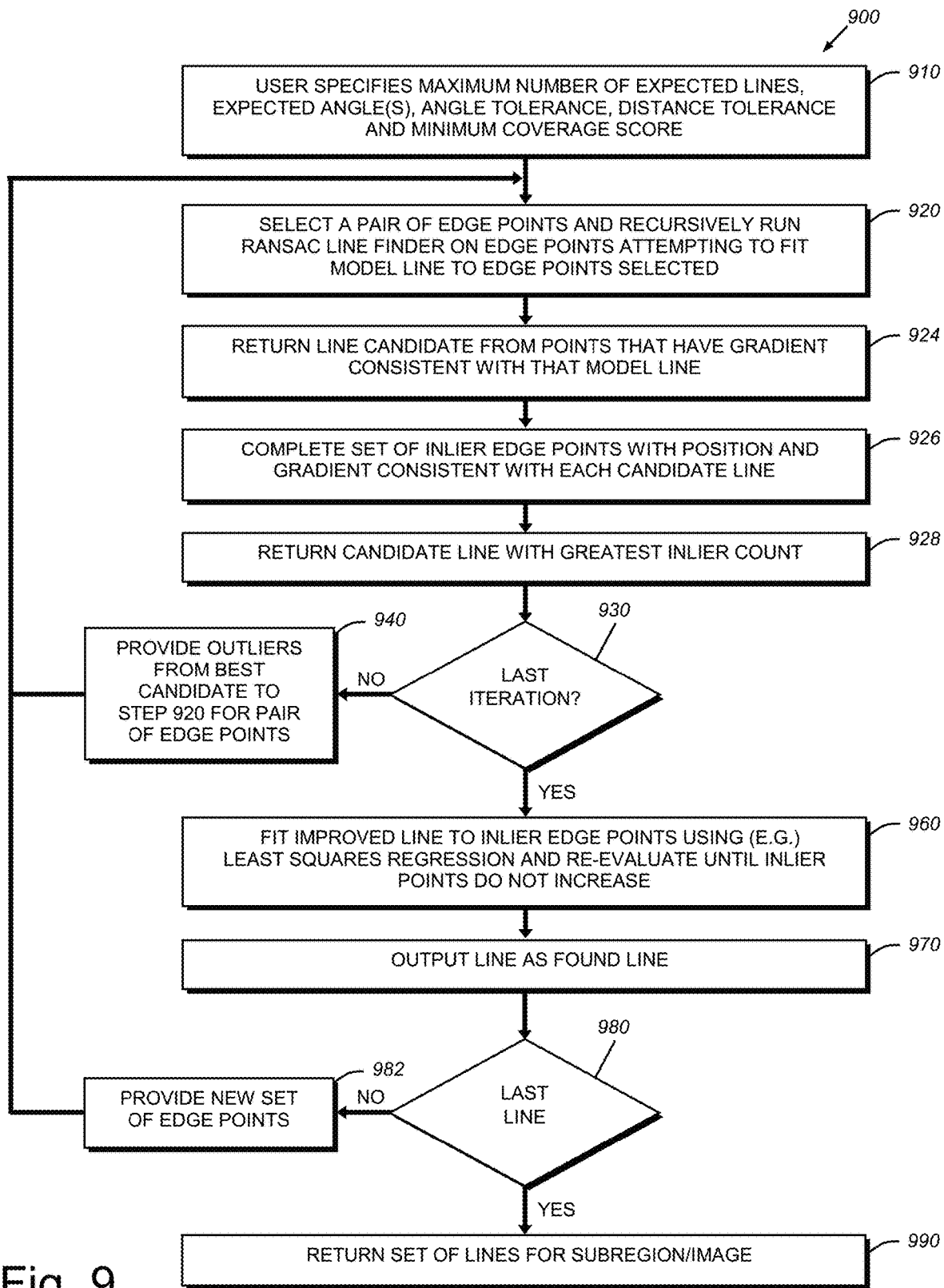
FIG. 9 is a flow diagram of a line-finding procedure based upon found edge points in FIG. 3, using an exemplary RANSAC process according to an illustrative embodiment.

With reference now to step 360 of the procedure 300 (FIG. 3), thresholded edge point candidates are provided to the line-finder in accordance with an illustrative embodiment. By way of example, the line-finder operates recursively and employs (e.g.) RANdom SAmple Concensus (RANSAC)-based techniques. Reference is also made to the line-finding procedure 900 in FIG. 9. In step 910, the user specifies the maximum number of expected lines in an image, along with an expected angle, angle tolerance, distance tolerance, and (illustratively) a minimum coverage score (defined generally below) via (e.g.) the GUI. These parameters are used by the line-finder to operate the following processes. The lines are found for each subregion of the image by recursively running a RANSAC line finder, the edge point outliers from one stage becoming the input points to the next stage. Thus, in step 920, the procedure 900 selects a pair of edge points that are part of the group of edge points identified as extrema in the edge-finding process. The procedure 900 attempts to fit a model line to the selected edge points based on matching gradient values (within the selected range of tolerance) that are consistent with a model line. In step 924, one or more line candidate(s) from step 922 is/are returned. Each line-finding stage returns a candidate line, its inliers and outliers. The returned line(s) is/are subjected to a computation of inlier edge points that have a position and gradient consistent with the line candidate (step 926). In step 928, the candidate line with the greatest inlier count is identified. The above-described line-finding stage (steps 920-928) terminates when it reaches the maximum number of RANSAC iterations allowed (decision step 930). The maximum number of iterations inside each line-finding stage are computed automatically using an internally computed worst case proportion of outliers and an assurance level specified by the user. Each line finding stage returns the line with the maximum number of captured edge points out of all its iterations—subject to a user-specified fit tolerance, geometric constraints and polarity. Each edge point can only be assigned to the inlier list of a single line and each line is only allowed to contain at most one edge point from each projection region. The gradient orientation of an edge point, along with its position, is used to determine whether it should be included in the inlier list of a candidate line. In particular, edge points should have gradient orientation that is consistent with the angle of a candidate line.

If the decision step 930 determines that more iterations are permitted, the outliers from the best inlier candidate are returned (step 940) to the RANSAC process (step 920) for use in finding a line candidate.

During each RANSAC iteration, two edge points belonging to different projection regions are randomly selected and a line will be fit to those two points. The resulting candidate line receives further consideration only if its angle is consistent with the gradient angles of both edges in the point pair and if the angle of the line is consistent with the uncertainty range specified by the user. In general, the gradient direction of an edge point is nominally orthogonal, but is allowed to differ by a user-configured angle tolerance. If a candidate line passes these initial tests, then the number of inlier edge points will be evaluated, otherwise a new RANSAC iteration is initiated. An edge point will be regarded as an inlier of a candidate line only if its gradient direction and position are consistent with the line—based on gradient angle and distance tolerances specified by the user.

When the RANSAC iterations reach the maximum (decision step 930), the inliers of the best found line candidate are subjected to an improved line fit, using (for example) a least squares regression or another acceptable approximation technique, and the set of inlier edge points will be reevaluated, repeating these steps a maximum of N (e.g. three or more) times until the number of inliers ceases to further increase or decrease (step 960). This is the line that is indicated as found in step 970.

The decision step 980 determines whether more lines are to be found (based (e.g.) on searching further sub regions or another criteria), and if so, the process loops back to step 920 to operate on a new set of edge points (step 982). When the points have been exhausted or a maximum iteration count is reached, the procedure 900 returns a set of (i.e. multiple) found lines in the image in step 990.

Figure 10:
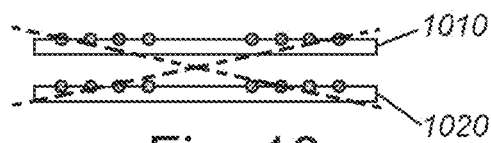
FIGS. 10 and 11 are diagrams showing erroneous and correct alignment of edge points relative to closely spaced parallel line features, respectively.
Figure 11:
Figure 12:
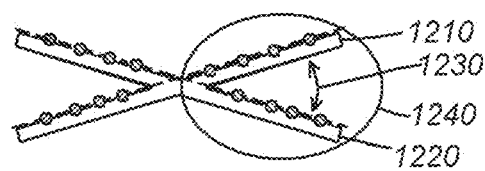
FIGS. 12 and 13 are diagrams showing correct and erroneous alignment of edge points relative to crossing line features, respectively, which can be resolved according to the line-finder of the illustrative system and method.
Figure 13:
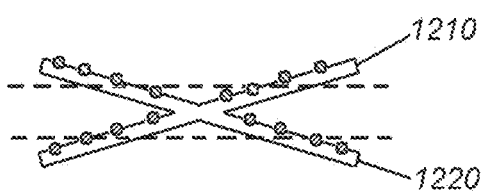

The multi-line finder is adapted to perform a final adjustment of existing results in cases where two line results intersect one another within the inspection region. As illustrated generally in FIGS. 10 and 11, for closely spaced parallel lines 1010 and 1020, erroneous line results (i.e. FIG. 10) can sometimes be obtained due to the statistical nature of the RANSAC procedure. However, when such errors occur, an exchange of inlier point groups (arrow 1120 in groups 1110 in FIG. 11) can sometimes locate the correct lines with increased coverage scores and reduced-fit residuals. Point exchanges can be most effective when an image contains closely spaced parallel lines as shown. Conversely, when the image contains lines 1210 and 1220 that actually do cross each other as shown in FIGS. 12 and 13, then coverage scores are reduced after a point exchange (arrow 1230 in group 1240 in FIG. 12), so the original results obtained before the exchange are retained by the process to successfully detect crossing lines.

Note that the RANSAC procedure is one of a variety of techniques by which the line-finder can fit points to a line. In alternate embodiments, the candidate points can be selected according to a set displacement therebetween or the image can be processed using (e.g.) an exhaustive search technique. Thus, as used herein the reference to the RANSAC technique should be taken broadly to include a variety of similar point-fitting techniques.

Additional functionalities of this system and method can be provided. These include support for mixed-polarity, automatically computing the projection region width, support multi-view line finding, and allowing the input image be free of pre-warpage to remove optical distortion. These functionalities are described further below.

Figure 14:
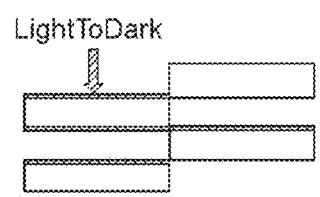
FIGS. 14-17 are diagrams showing examples of lines exhibiting, respectively, light-to-dark polarity, dark-to-light-polarity, either light-to-dark or dark-to-light polarity, or mixed polarity, which can be resolved according to the line-finder of the illustrative system and method.
Figure 15:
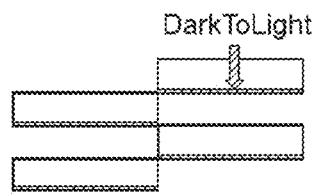
Figure 16:
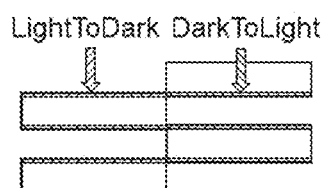
Figure 17:
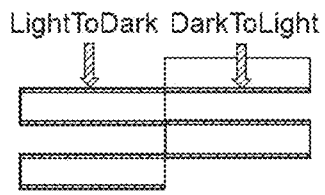

With further reference to the examples of FIGS. 14-16, the line-finding system and method of the illustrative embodiment generally supports standard LightToDark, DarkToLight and Either polarity settings (respectively) for the contrast between edges that are found. In addition, the system and method can also support a mixed-polarity setting (FIG. 17) in which both a Light-To-Dark and Dark-to-Light characteristic appears in the same line. Line-finding results of all four settings are illustrated in the following figure. In an illustrative embodiment, the system and method can include a mixed-polarity setting that allows finding of a single line that contains edge points of opposite polarities. This differs from a conventional setting of "Either" polarity in which all edge points of a single line are either polarity—but only one polarity. The mixed-polarity setting can be advantageous when used to analyze the light and dark checkerboards of (e.g.) a calibration plate, among other applications.

The user can select improved shift invariance of line-finding. In such case, the edge point extractor employs substantially overlapped projection regions to improve result stability. When the regions are non-overlapping, pixels under consideration can potentially move out of the projection regions when the image is shifted, resulting in poor shift invariance in line-finding results. Overlapped projection regions ensure that the pixels under consideration are continuously covered by projection regions. If overlapped projection regions are used, then incremental computation can be performed to maintain speed, along with possible low-level optimization.

The user can provide masks that omit certain portions of the acquired image and/or imaged surface from analysis for line features. This can be desirable where the surface includes known line features that are not of interest (e.g. barcodes that are analyzed by other mechanisms, text, and any other structures that are not germane to the task for which lines are to be found. Thus, the edge point extractor can support image masking where "don't care" regions in an image can be masked out, and "care" regions are masked in. Where such masking occurs, the coverage scores of the found lines is illustratively reweighted according to the number of edge points falling within the mask.

Figure 18:
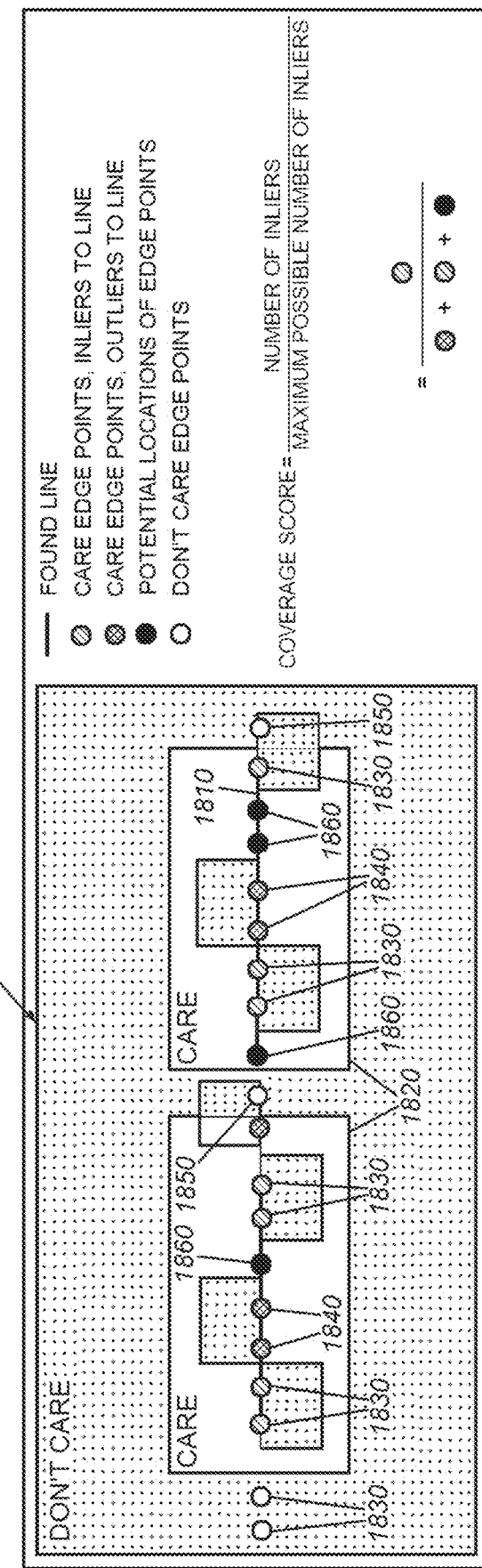
FIG. 18 is a diagram showing modification of the coverage score for a found line in view of a user-defined mask.

Reference is made to the exemplary image region 1800 of FIG. 18, which shows coverage scores when image masks are present and the effect of image masking on such coverage scores. The edge point extractor supports image masking where "don't care regions" in an image can be masked out. As shown, the found line 1810 is characterized (based upon the "care" mask regions 1820) by care edge points. Such care edge points consist of care edge point inliers 1830 to the line 1810 and care edge point outliers 1840 to the line 1810. Don't care edge points 1850 on the line 1810 reside between care regions 1820 of the mask, as shown in this example, and are not included in the coverage score computation, even if they reside on the line as inliers. Potential locations 1860 for edge points along the line 1810 are also determined, as shown. These potential locations are positioned between known points at predictable spacing based on the spacing of found points. Illustratively, the coverage scores of the found lines are reweighted according to the number of edge points falling within the mask. The coverage score is, thus, modified as follows:

coverage score=number of care edge point inliers to line/(number of care edge point inliers to line+ care edge point outliers to line+number of care potential locations of edge points).

After running the line-finding process according to the system and method herein, the found lines can be sorted in various ways based on sort criteria specified by the user (via (e.g.) the GUI). The user can choose from intrinsic sort measures such as inlier coverage score, intensity or contrast. The user can also choose from extrinsic sort measures such as signed distance or relative angle. When using extrinsic sort measures, the user can specify a reference line segment against which the extrinsic measures of the found lines are to be computed.

As described generally above, this system and method can include a Multi-Field-of-View (MFOV) overload, where a vector of images from different fields of view can be passed into the process. The images should all be in a common client coordinate space based upon a calibration. As noted above, this functionality can be extremely helpful in application scenarios where multiple cameras are used to capture partial areas of a single part. Because the edge points retain gradient information, line features that are projected between gaps in the field of view can still be resolved (when the gradients in both FOVs match for a given line orientation and alignment in each FOV.

Notably, the system and method does not require (allows the image to be free-of) removal of warpage (i.e. does not require the image to be unwarped) to remove nonlinear distortion, assuming the distortion is non-severe. Where the image is not unwarped, the system and method can still detect candidate edge points, and map the point positions and gradient vectors through a nonlinear transform.

It should be clear that the line-finder provided according to the system, and method and various alternate embodiments/improvements is an effective and robust tool for determining multiple line features under a variety of conditions. In general, when used to find line features, the system and method has no particular limit on the maximum number of lines to be found in an image. Only memory and compute time will place practical limits on the number of lines that can be found.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub—processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for finding line features in an image, the system comprising:
   a graphical user interface configured to receive user inputs; and
   a processor in communication with the graphical user interface and configured to:
   receive image data of a scene containing line features;
   receive a user input from the graphical user interface, the user input including an angle tolerance;
   analyze the image data to obtain edge points corresponding to an edge feature within the image;
   generate a plurality of lines that are consistent with the edge points obtained from the image data and the user input; and
   display the plurality of lines on the image, via the graphical user interface.

2. The system of claim 1, wherein the user input further comprises: at least one of a maximum number of expected lines, a distance tolerance, an expected angle, or a minimum coverage score.

3. The system of claim 1, wherein the user input further comprises a mask configured to omit a portion of the image data prior to generating the plurality of lines.

4. The system of claim 1, wherein generating the plurality of lines includes performing a line fit approximation.

5. The system of claim 4, wherein the line fit approximation is a least squares regression.

6. The system of claim 1, wherein the user input further comprises a polarity selection.

7. The system of claim 1, wherein the processor is further configured to smooth the image data via a smoothing kernel.

8. The system of claim 7, wherein the smoothing kernel comprises a Gaussian kernel.

9. The system of claim 1, wherein the user input further comprises an expected angle, and the processor is configured to obtain the edge points by running field projections in a single direction that substantially matches the expected angle.

10. The system of claim 1, wherein the edge points are selected based upon a threshold defined by an absolute contrast and a contrast normalized based on average intensity of the image data.

11. The system of claim 1, further comprising a camera configured to capture the image and provide the image data to the processor.

12. The system of claim 1, further comprising a display configured to provide the graphical user interface.

13. The system of claim 1, wherein obtaining the edge points comprises:
   (a) computing a gradient vector field from the image data;
   (b) projecting the gradient vector field over a plurality of gradient projection sub-regions; and
   (c) finding a plurality of edge points in respective of the gradient projection sub-regions based on the projected gradient data.

14. The system of claim 1, wherein obtaining the edge points comprises:
   (a) subjecting the image data to a gradient field calculation process to generate two gradient component images and an intensity image;
   (b) applying a weighted projection to the two gradient component images and the intensity image resulting in one-dimensional (1D) projection profiles of the two gradient component images and the projection image; and
   (c) extracting edge points by combining the 1D projection profiles of the two gradient component images.

15. A method for finding line features in an image, the method comprising:
   receiving image data of a scene containing line features;
   receiving a user input from a graphical user interface, the user input including an angle tolerance;
   analyzing the image data to obtain edge points corresponding to an edge feature within the image;
   generating a plurality of lines that are consistent with the edge points obtained from the image data and the user input; and
   displaying the plurality of lines on the image, via the graphical user interface.

16. The method of claim 15, further comprising, prior to analyzing the image data, smoothing the image data via a smoothing kernel.

17. The method of claim 15, further comprising:
   receiving a mask via the user input; and
   omitting a portion of the image data based on the mask, prior to generating the plurality of lines.

18. The method of claim 15, wherein generating the plurality of lines includes performing a line fit approximation.

19. The method of claim 15, wherein obtaining the edge points comprises:
   (a) computing a gradient vector field from the image data;
   (b) projecting the gradient vector field over a plurality of gradient projection sub-regions; and
   (c) finding a plurality of edge points in respective of the gradient projection sub-regions based on the projected gradient data.

20. A method for finding line features in an image, the method comprising:
   receiving image data of a scene containing line features;
   receiving a user input corresponding to an angle tolerance and a mask;

omitting a portion of the image data corresponding to the mask;
analyzing the remaining image data to obtain edge points corresponding to an edge feature within the image;
generating a plurality of lines that are consistent with the edge points obtained from the image data and the angle tolerance; and
displaying the plurality of lines on the image.

* * * * *